Nov. 10, 1964  H. W. BIGGE  3,156,487
STEERING DEVICE FOR CONNECTED TRACTOR AND DOLLY VEHICLES
Filed Sept. 25, 1961  5 Sheets-Sheet 1
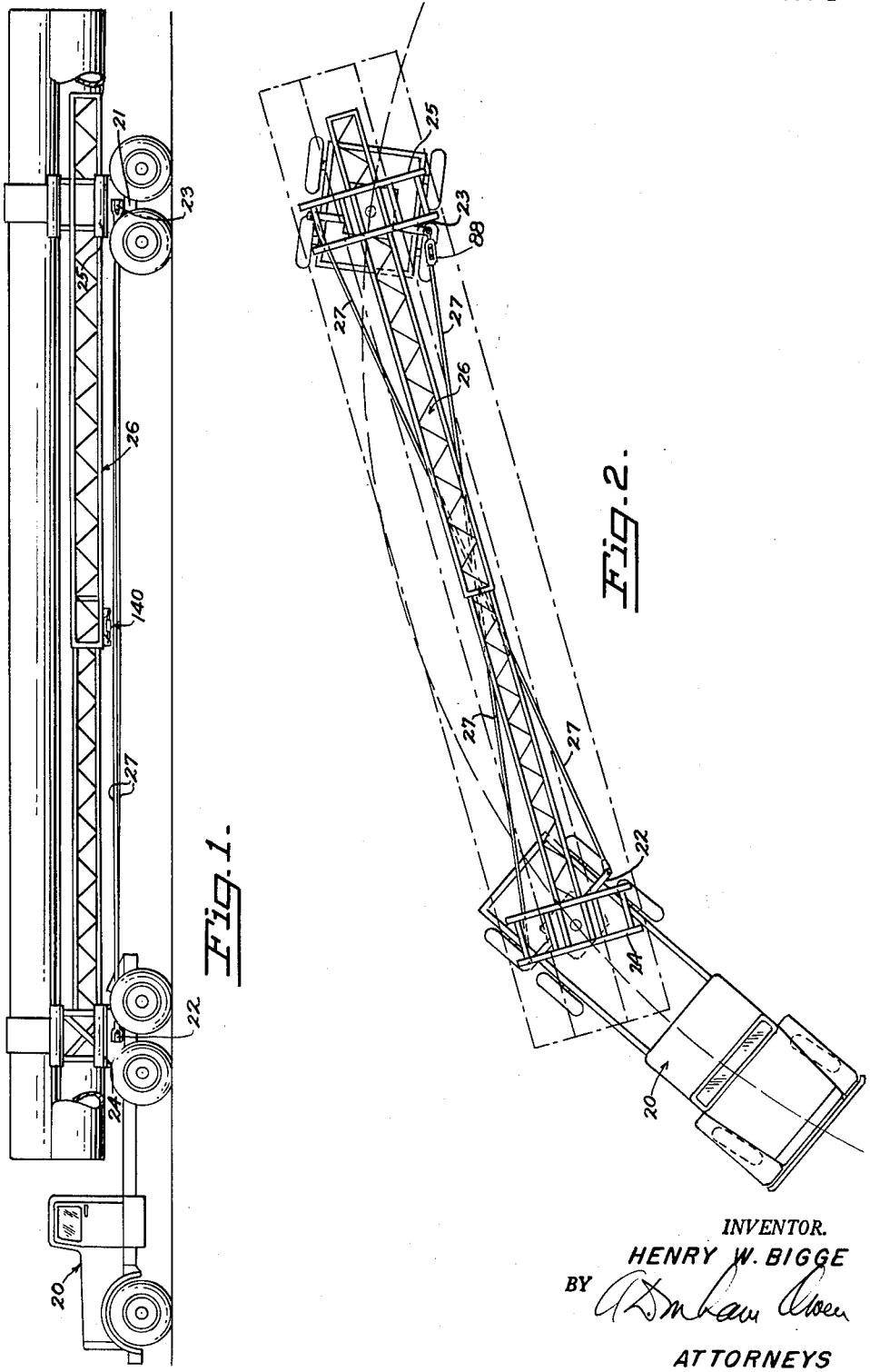
INVENTOR.
HENRY W. BIGGE
BY
ATTORNEYS

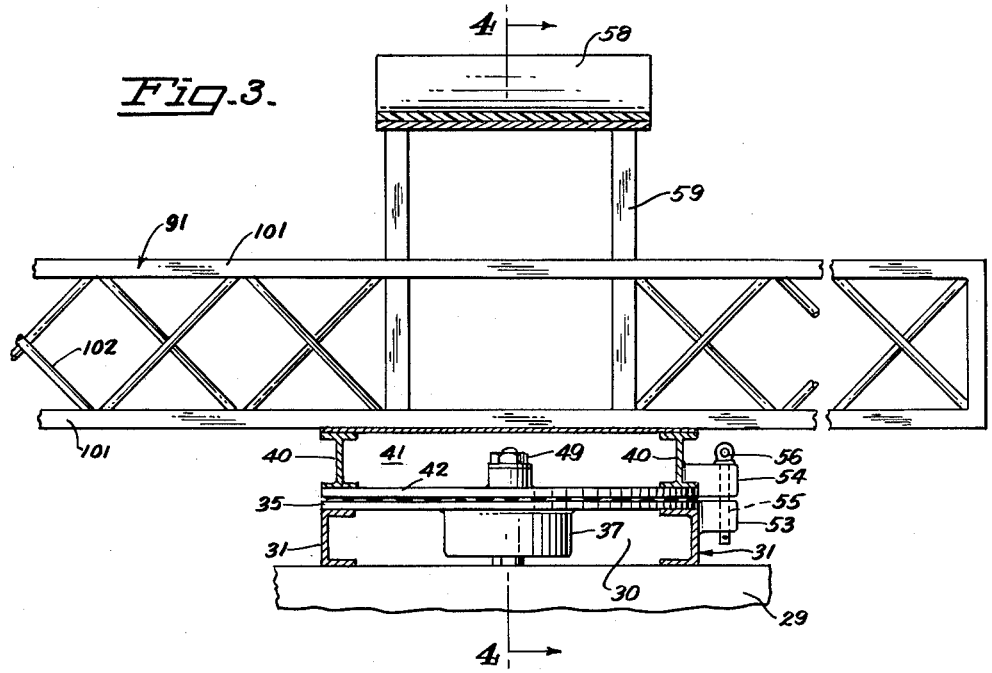
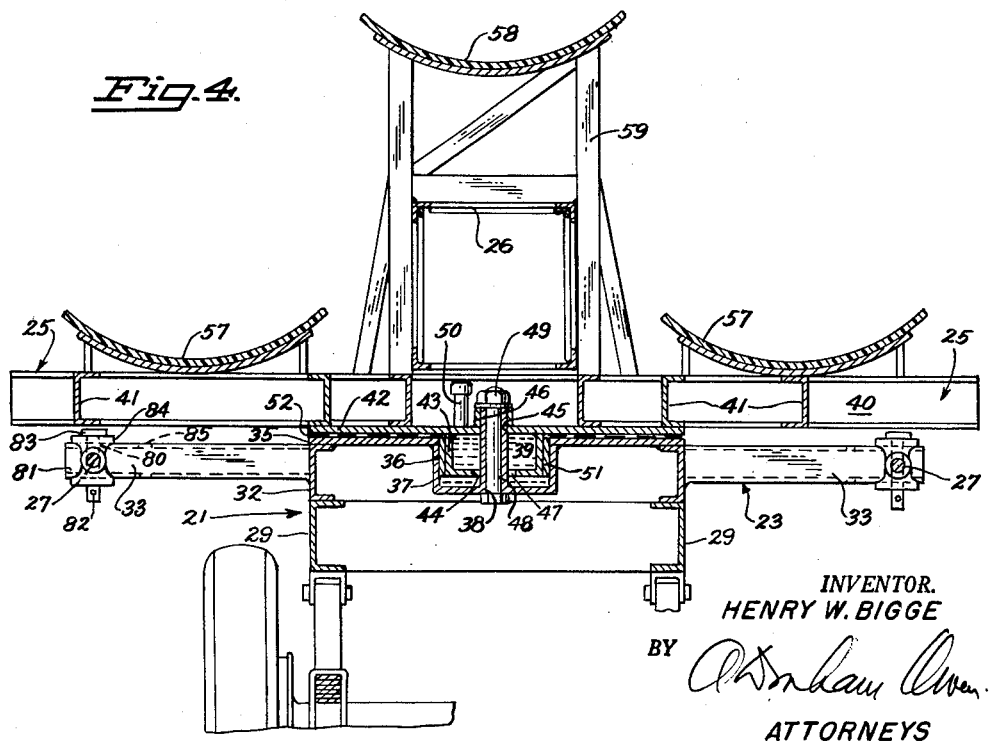

Nov. 10, 1964  H. W. BIGGE  3,156,487
STEERING DEVICE FOR CONNECTED TRACTOR AND DOLLY VEHICLES
Filed Sept. 25, 1961  5 Sheets-Sheet 3
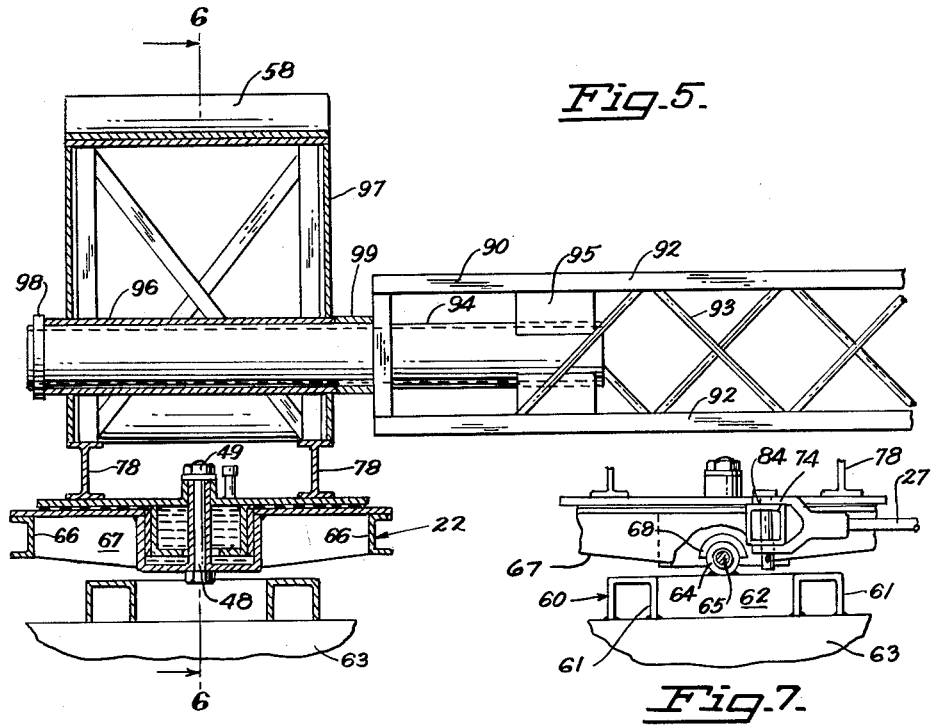
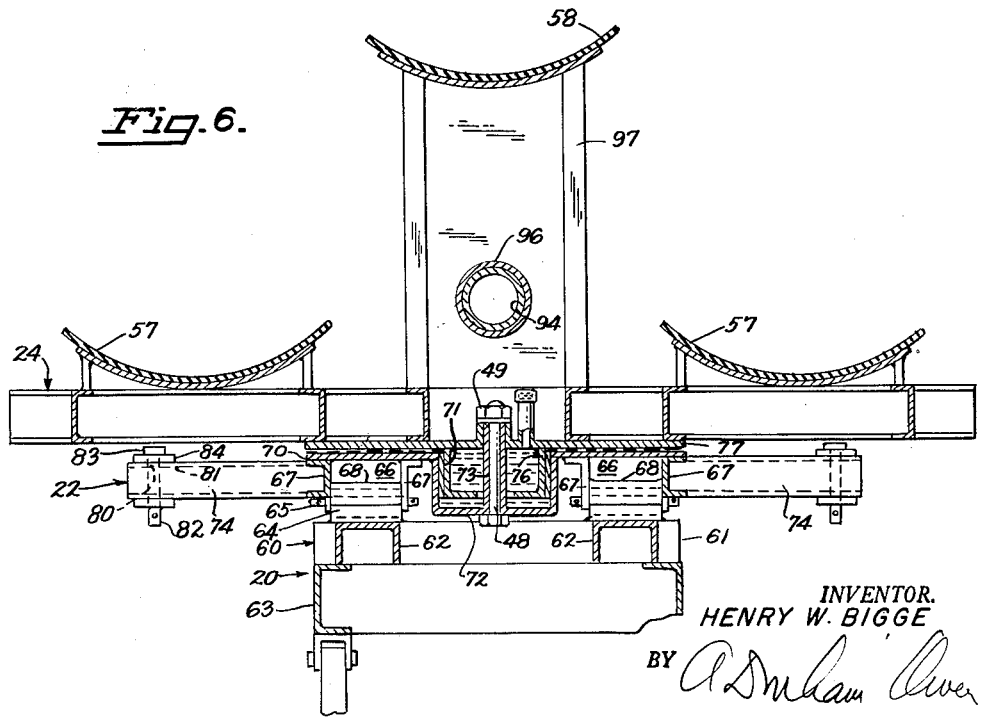
INVENTOR.
HENRY W. BIGGE
BY
ATTORNEYS

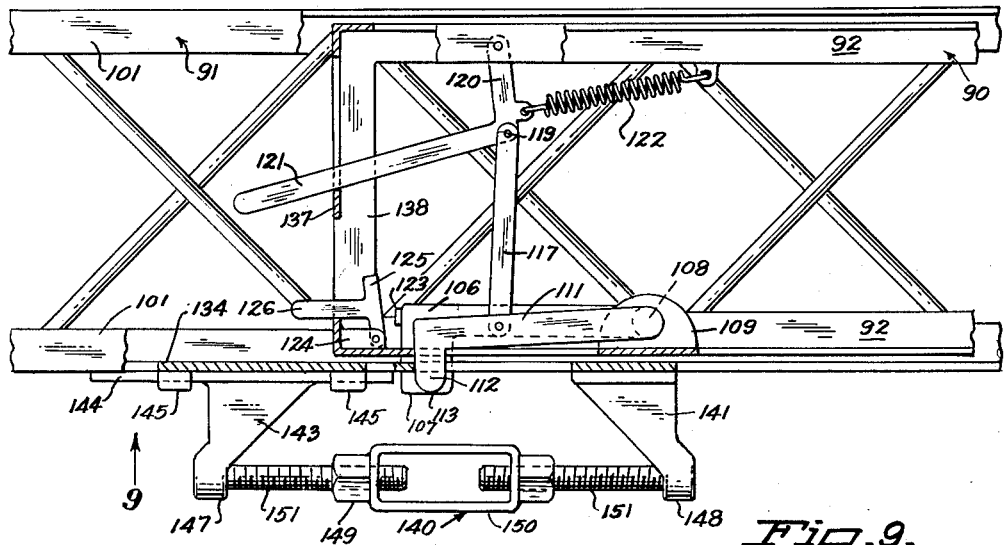

Nov. 10, 1964    H. W. BIGGE    3,156,487
STEERING DEVICE FOR CONNECTED TRACTOR AND DOLLY VEHICLES
Filed Sept. 25, 1961    5 Sheets-Sheet 5
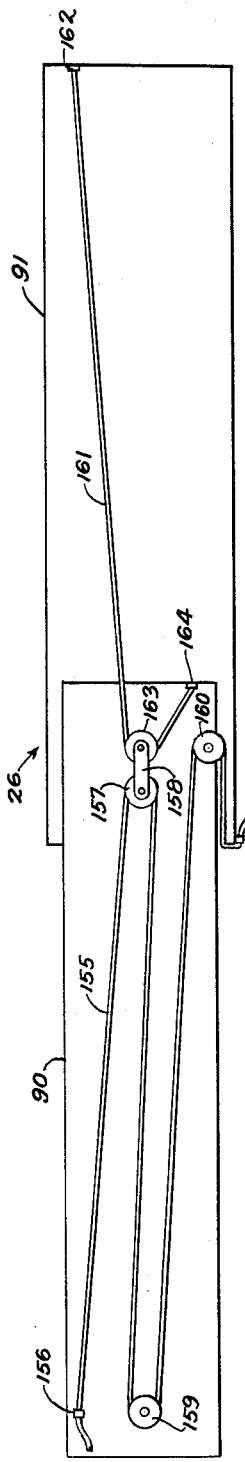
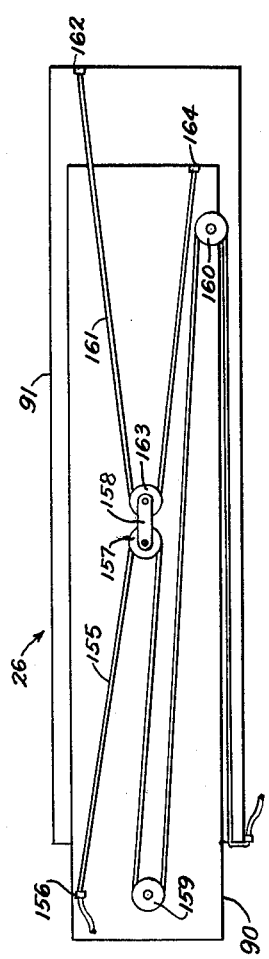
INVENTOR.
HENRY W. BIGGE
BY
ATTORNEYS

United States Patent Office 3,156,487
Patented Nov. 10, 1964

3,156,487
STEERING DEVICE FOR CONNECTED TRACTOR AND DOLLY VEHICLES
Henry W. Bigge, 50 Marsh Place, Oakland, Calif.
Filed Sept. 25, 1961, Ser. No. 140,487
12 Claims. (Cl. 280—426)

This invention relates to tractor-trailer vehicles for hauling extremely long loads, and more particularly it relates to an automatic steering device for such vehicles which will enable the trailer to track in a desired path behind the tractor during all turning maneuvers.

In conventional truck-trailer combinations, the trailer, bogie or dolly drawn by the tractor vehicle will not follow directly behind the tractor during turns but will progressively turn inside the tractor vehicle. This inherent characteristic of non-steerable trailers heretofore presented a particularly serious problem where it was necessary to haul long loads over roads or highways with limited width. In some instances such width limitations are due to the actual road bed measurements, and in other instances the limitation is imposed by local transport regulations. In the prior art various forms of manually controlled trailers were devised to solve the trailer steering problem. Also some efforts were made to provide an automatic trailer steering mechanism, but these resulted in highly complicated mechanical systems, all of which failed to provide a practical solution to the problem.

In all tractor-trailer combinations whether it be a tractor with a dolly with fixed axles or a trailer with a steerable axle, the problem is that of providing a means of turning the auxiliary dolly or trailer vehicle an amount exactly proportional to the degree of turn being made by the tractor vehicle, so that the trailer will track either directly in the path of the tractor or in some other predetermined tracking path. To assure effective operation of the trailer the response of the trailer steering means to the turning of the tractor must be immediate and accurate. No lag in reaction or slippage of linkage components can be tolerated. Also it is necessary that the steering system be as simplified as possible so that the initial cost and subsequent maintenance of the steering system will be at a minimum.

In my co-pending application Serial No. 91,470, filed February 24, 1961 now Patent No. 3,102,735, I disclosed a tractor-trailer combination comprising a trailer vehicle having two axles spaced relatively far apart with one of the axles being steerable and controlled by a novel linkage means. However, while this invention has proven its effectiveness, there has been a long felt need for a tractor-trailer steering system that would allow the utilization of conventional fixed axle trailer vehicles such as the well-known logging dolly.

An important object of the present invention, therefore, is to provide an automatic steering system which can be utilized in combination with a tractor vehicle and a standard logging dolly consisting of close coupled nonsteerable axles so that the dolly, though coupled at a long distance from the tractor or truck to accommodate long loads, will track along a predetermined path behind the tractor on all turning maneuvers. By virtue of its novel arrangement of components, my invention provides a steering system which can be installed on a logging dolly and tractor quickly and easily with a minimum of time and expense.

Another object of the invention is to provide a steering system for a tractor-logging dolly combination in which the turning of the tractor vehicle causes a predetermined proportional amount of turning of the fixed axle dolly which is sufficient to cause the dolly to track along a predetermined path behind the tractor.

Another object of the invention is to provide a steering system wherein the dolly is turned in a direction opposite to that of the tractor and an amount proportional to the amount of tractor turning, by links connected directly from the dolly to the tractor.

Another object of the invention is to provide a tractor-trailer vehicle for hauling long loads in which the load carrying means are connected by an extendable reach and are pivotally connected to both the tractor and trailer vehicle. In my invention the load carrying means and the interconnecting reach act as a long arm extending between the tractor and the dolly about which the entire dolly can be rotated in response to a proportionate amount of turning of the tractor.

Still another object of the invention is to provide a means for reducing friction in the pivotal connection between the tractor and dolly vehicles and their respective load carrying means.

Another object of the invention is to provide a means for automatically latching the extendable reach sections and for varying the relative position of the reach sections to control the tension in the steering cables.

Another object of the invention is to provide a tractor-logging dolly combination in which the logging dolly is steerable in proportion to the amount of turning of the tractor vehicle and in which the automatic turning mechanism can be quickly disconnected when desired so that the dolly can be used in the unsteerable conventional manner.

Another object of the invention is to provide a steerable tractor trailer combination that will have positive directional control when either backing up or going forward.

Other objects and advantages and important features of the present invention will become apparent during the course of the following description, references being had therein to the accompanying drawings in which:

FIG. 1 is a side view in elevation of a tractor and steerable dolly combination according to the present invention.

FIG. 2 is a slightly enlarged plan view of the present invention showing the steerable dolly and tractor combination of FIG. 1 in a slight turn.

FIG. 3 is an enlarged view in elevation and partially in section showing details of the steering system mounted on a dolly. Only a fragmentary portion of the dolly is shown.

FIG. 4 is an enlarged view in elevation and in section taken along line 4—4 of FIG. 5.

FIG. 5 is an enlarged view in elevation and in section showing details of the connected load bed and steering bar assemblies for the tractor.

FIG. 6 is a view in elevation and in section taken along line 6—6 of FIG. 5.

FIG. 7 is an enlarged fragmentary view in elevation showing the connection of the pivotal connection of the tractor load bed and steering bar assemblies in greater detail.

FIG. 8 is an enlarged view in elevation and partially in section showing the latching mechanism and the extension slide for the extendable reach sections.

FIG. 9 is a lower plan view taken along line 9—9 of FIG. 8.

FIG. 10 is a fragmentary view in perspective of the latching mechanism for the extendable reach members shown in FIG. 8.

FIG. 11 is an enlarged somewhat schematic view in elevation of the reach members in the extended position.

FIG. 12 is a schematic view in elevation of the reach members of FIG. 11, shown in the retracted position.

Referring now more particularly to the drawings, there is shown in FIGS. 1 and 2 a tractor-trailer unit which includes a conventional tractor or truck generally indicated as 20 and a trailer indicated as 21. The trailer 21, in accordance with the principles of the invention, is actually a logging dolly or bogie having fixed rather than steerable axles, and preferably two of them closely spaced together. Both the tractor vehicle 20 and the logging dolly 21 may be for the most part vehicles of conventional construction, but in accordance with the principles of the invention, these vehicles are modified slightly to receive in combination the steering elements of the invention which enable the dolly 21 to track directly in the path of the tractor 20 or along some other path having a predetermined radius during all turn maneuvers.

In its broad aspects, my steering system comprises first and second steering bar members 22 and 23 which are fixed rigidly to the tractor 20 and the dolly vehicle 21, respectively. The lengths of the steering bar members 22 and 23 are established at a predetermined ratio which controls the steering path of the dolly vehicle 21 relative to the tractor 20. Rotatably mounted on each of the steering bar members 22 and 23 are load beds 24 and 25 respectively, each having means for supporting the ends of extremely long and heavy load members such as prefabricated beams, piping, or wood poles. The load beds 24 and 25, though rotatable with respect to the tractor and dolly vehicles 20 and 21, are fixedly connected by a telescoping reach 26. This combination thus provides an arm extending from the tractor to the dolly about which the dolly can be turned a precise amount. The reach 26 also enables the tractor-dolly unit to be shortened immediately for operation when unloaded.

Attached to the steering bar 22 of the tractor 20 and the steering bar 23 of the dolly 21 are a pair of flexible steering cable members 27. The cable members 27 are attached at their forward ends to the tractor vehicle 20 at a predetermined fixed distance apart, and they cross each other as they extend rearwardly where their other ends are connected to the dolly 21, also at a predetermined fixed distance apart. With the cables 27 so arranged, a turning movement by the tractor 20 away from its center line will cause the dolly 21 to turn a predetermined amount in the opposite direction as shown in FIG. 2. The distances between the cable attaching points on the steering bars 22 and 23 may be adjustable so that an amount of turning by the tractor 20 will cause just the right amount of turning by the dolly vehicle 21 to thereby cause it to track directly behind the tractor 20 or along some other path having a desired radius during a turn. For each distance between the tractor 20 and the dolly 21 the cables 27 may be adjusted to one proper fixed distance apart on the tractor and dolly steering bars 22 and 23, and when this proper setting is made, the dolly 21 will always track behind the tractor vehicle along the desired pathway no matter what the degree of turn. Therefore, as a practical matter, very little adjustment is required for the cable attachment points unless the distance between the tractor and the dolly is to be varied such as by retraction of the reach 26.

In FIGS. 3 and 4 the steering bar assembly 23 for the dolly vehicle 21 is shown in detail. As constructed it may be readily attached either permanently or by some convenient removable means to the frame 29 of a conventional dolly vehicle such as a production logging dolly to thereby convert the dolly to the steering system of the invention.

The steering bar assembly 23, as shown in FIGS. 2, 3 and 4, comprises a rectangular frame 30 made up of a pair of longitudinal channel members 31 joined together by a series of cross members 32. The frame 30 may be either welded or bolted to the dolly frame 29. Attached at right angles to each of the cross members 32 is an outwardly extending arm 33 preferably formed as a box beam by connecting channels and supported by members 34 to which are attached the steering cables 27. Fixed to the top of the frame 30 is a flat metal plate 35 having a central circular opening 36 and around the opening 36 is fixed a recessed saucer member 37 having an open top and a circular cross ssection. Each saucer member 37 also has a relatively small central opening 38 in its bottom around which is fixed an upwardly extending sleeve member 39 (FIG. 4).

The load bed 25 pivotally mounted on top of the frame 30 is formed by two equally spaced cross beam members 40 joined together by a series of connecting members 41 and attached to a lower plate 42 fixed across the cross beam members 40. To the lower plate 42 is attached a cup member 43 having a circular cross section and an outside diameter less than the saucer member 37 on the steering bar assembly 23. Centrally located in the bottom of the cup member 43 is a circular opening 44 which is axially aligned with another circular opening 45 in the plate 42 above. A short sleeve 46 is fixed to the upper side of the plate 42 around the opening 45. When the load bed 25 is connected to the steering bar assembly 23 fixed to the dolly frame 29, the sleeve 39 within the saucer 37 extends upward through the opening 44 in the cup member 43 and the opening 45 and the short sleeve 46 on the lower plate 42 of the load bed assembly 25. The opening 44 in the cup member 43 is large enough to provide a substantial annular clearance 47 around the sleeve 39 which may fit within the opening 45 and the short sleeve 46 with a closer sliding fit. To complete the connection between the steering bar assembly 23 and the load bed assembly 25, a large bolt 48 is placed within the sleeve 39 with means such as a nut 49 to hold the two assemblies 23 and 25 together.

To reduce to a minimum the friction between the pivotal load bed 25 and the steering bar assembly 23, the cup member 43 is filled with a heavy lubricating oil through an inlet 50. The oil in the cup 43 passes through the annular clearance 47 and around the sleeve 39 and into the mating saucer member 37. A bronze bushing 51 may be placed between the cup and saucer members 43 and 37 to provide a durable bearing surface. A small amount of clearance is provided between these members to allow oil in the saucer member 37 to be forced at a slow rate upward past the bushing 51 and between the plates 35 and 42 where it forms a lubricating film indicated by numeral 52 that further reduces the friction between the load bed 25 and the steering bar assembly 23. The clearance between the plate 35 and 42 for the film 52 is shown in greatly exaggerated proportion in FIGS. 3 and 4. The cup and saucer arrangement is an important feature of my invention since it not only provides a friction free oil cushion between the load bed 25 and the steering bar assembly 23, but it also simultaneously feeds oil upward past the bushing 51 to form the film 52. Thus the turning maneuvers of both the tractor and the dolly can be executed smoothly despite extremely heavy loads.

On the rear side of the frame 30 is welded a bracket 53 and a similar bracket 54 is provided on the rear side of the load bed 25. Each of the brackets 53 and 54 have a bore hole 55, and when the load bed 25 is aligned with the dolly steering bar assembly 23 so that the reach 26 is perpendicular to the dolly axles, the bores 55 in the brackets 53 and 54 are aligned. Thus, when the dolly 21 is being hauled with no load with the reach 26 retracted, a pin 56 may be placed in the brackets 53 and 54 to prevent rotation of the load bed 25.

The load bed 25 may have any suitable load retaining means but for long heavy cylindrical load members such as pipes, I prefer to use curved rubber lined saddle like members 57 attached across the load bed cross beams 40. A central saddle member 58 is mounted on a frame 59 attached to the cross beams 40 which also provides a means for attaching the extendable reach 26 to the dolly 21.

An important feature of my novel steering system is that the components constructed according to the invention can easily be attached in combination with conventional vehicles. As a means of mounting the tractor steering bar assembly 22 on the tractor vehicle 20 a support frame 60 (FIGS. 5–7), formed by a pair of spaced apart channel members 61 and connected by a pair of cross pieces 62 may be welded or bolted directly to the body frame 63 of the tractor 20. Welded to each of the cross pieces 62 is a cylindrical sleeve member 64 in which is rotatably mounted a pin 65.

The tractor steering bar assembly 22 is somewhat similar to the steering bar assembly 23 on the dolly 21 except that it provides means in combination with the sleeves 64 and the pins 65 for affording a pitching degree of freedom between the dolly 21 and the tractor 20. It has a pair of spaced apart channel members 66 that are joined by two pairs of connecting members 67. Between each pair of connecting members 67 is welded a metal bearing shell 68 having a semi-circular cross-section with an inner curvature preferably equal to and adapted to fit around a sleeve member 64. Holes are provided in proper alignment in each pair of the connecting members 67 so that the pins 65 in the sleeves 64 will retain the steering bar assembly 22 in position. However, the load from steering bar assembly 22 is transferred by the curved bearing shells 68 to the sleeves 64 while the pins 65 merely float within the sleeves 64.

The remainder of the tractor steering bar assembly 22 is similar to the dolly steering bar assembly 23. A plate 70 having a central opening 71 is attached to the channel members 66 and the connecting members 67, and a saucer member 72 is connected around the opening 71. The saucer member 72 may be similar in every detail to the dolly saucer member 37, having an upwardly extending sleeve member 73. Extending outwardly from the tractor steering bar assembly 22 are a pair of arms 74 braced by supporting members 75 to which are attached the cables 27.

The tractor load bed assembly 24 is also similar to the dolly load bed assembly 25, and has a cup member 76 attached to a plate 77 which rides in the saucer member 72. The plate 77 is attached to a pair of spaced apart members 78 connected together by a series of members 79. The tractor load bed assembly 24 and the steering bar assembly 22 are also held together by a bolt 48 and a nut 49 or an equivalent pin means, and the cup and saucer members 76 and 72 are lubricated in the same manner by oil within the cup and a bushing 51 which rides between the cup and saucer.

The turning of the dolly 21 as described above, is accomplished according to my invention by the cables 27 connected between the tractor 20 and the dolly 21. On each of the outward extending arms 33 and 74 of the tractor 20 and the dolly 21, a means is provided for connecting the end of a cable 27. As shown in FIGS. 4 and 6, this connection may be accomplished simply by providing aligned reinforced holes 80 through the upper and lower flanges 81 of channels comprising the cross arms 33 and 74. A pin 82 having a fixed head 83 and a snug but slidable clearance with the holes 80 is provided to retain the cable ends.

The cable attaching means on the tractor 20 are of necessity spaced more closely together than those on the dolly 21 so that a predetermined amount of turning of the tractor vehicle 20 will provide the desired amount of turning of the dolly 21 according to the proper ratio. As discussed above, this ratio of turning between the tractor and dolly 20 and 21 and hence the spacing of the cable attaching points will vary for different distances apart of the two vehicles. Therefore, means may be provided on either the tractor or trailer steering arms 33 and 74 for varying the distance between the cable attachments. Any convenient means may be provided to accomplish this function such as merely providing extra holes 85 in both cross arm flanges 81.

As shown in FIG. 2, the steering cables 27 are identical. Each is attached at one end to a tractor steering arm 74 on one side and to the dolly steering arm 33 on the opposite side of the vehicle. Thus the two cables 27 cross between the tractor 20 and the dolly 21, and as a result the turning of the tractor 20 and its steering bar assembly 22 in one direction causes a proportional turning of the dolly steering bar assembly 23, and consequently the dolly 21 itself, in the opposite direction. As stated above, this amount of turning is predetermined so that the dolly 21 will turn just the amount required to cause it to track in the desired path behind the tractor 20. When the steering bars 33 and 74 for the dolly 21 and the tractor 20 are of equal length, the dolly will track directly behind the tractor on all turns. But, when the steering bars 33 and 74 are of unequal lengths the dolly 21 will under-steer or over-steer for turns of a particular radius.

The steering cables 27 may be formed from any suitable type of heavy wire cable or rope and each end is supplied with a swaged clevis fitting 84 having an opening sufficient in size to snugly receive the cable attaching pins 82. The cables 27 may also be fitted with turnbuckles 88 (FIG. 2) to afford a means for adjusting the length of the cables in order to provide positive steering control between the tractor 20 and the dolly 21.

While the turning of the tractor 20 and dolly 21 take place, the long heavy load members are supported on the pivotal load beds 24 and 25 by the curved load supporting members 57. The reach 26 is fixed at one end to the movable load bed 24 of the tractor 20 and its other end is fixed to a movable load bed 25 on the dolly 21. It is preferably extendable to a relatively long length when the tractor 20 and the dolly 21 are loaded (FIG. 1), and it can therefore be retracted or telescoped when no load is being carried.

The reach 26 comprises an inner reach section 90 which is connected to the tractor load bed 24 and which is slidable within an outer section 91 attached to the movable load bed 25 on the steerable dolly 21. Both reach sections 90 and 91 are fabricated from structural steel members in a general box beam configuration, but other forms of telescoping structural configurations can be used within the scope of the invention.

The inner reach section 90 is formed by four parallel, longitudinal members 92 held together by diagonal side bracing members 93. As shown in FIG. 5, the section 90 is attached to the tractor load bed 24 preferably by means of a cylindrical member 94 which allows longitudinal twisting of the dolly 21 relative to the tractor 20. At the forward end of the inner reach section 90 the cylindrical member 94 is fixed between the longitudinal members 92 by internal diagonal bracing members 95. The cylindrical member 94 extends beyond the ends of the longitudinal members 92 and is adapted to fit within a cylindrical sleeve member 96 which is fixed to a support frame 97 on the tractor load bed 24. A circular cap 98 welded to the end of the cylindrical member 94 and a collar member 99 attached at a fixed distance from the end thereof serve to retain the cylindrical member 94 within the sleeve 96 on the support frame 97.

The outer reach section 91 has the same cross sectional rectangular shape but is slightly larger than the inner reach section 90 and is formed by longitudinal angle members 101 connected by side bracing members 102. One end of the outer reach section 91 is fixedly attached to the dolly load bed 25 by the frame 57 as described above, while the other end is slidably engaged with the inner reach section 90 as described below.

As shown in FIG. 2 the reach 26 is centrally located on both of the movable load beds 24 and 25 on the tractor 20 and the dolly 21 respectively. To provide maximum load carrying capacity the curved load carrying members 57 are fixed to the movable load beds 24 and 25 and the central load carrying members 58 are fixed on top of the support frames 57 and 97. Other forms of load carrying supports could, of course, be used within the scope of the invention.

A self-actuating latching mechanism 105 is provided to connect together the inner and outer reach sections 90 and 91 so that the reach 26 can be extended to its maximum position or retracted easily by one person. As shown in FIGS. 8 and 10, the inner reach section 90 attached to the tractor 20, has a substantially L-shaped locking dog member 106 having a downward extending integral end portion 107 adapted to connect the two reach members 90 and 91 in the retracted position and serving as a cable tensioning means in the extended position. The dog member 106 is connected to a shaft 108 supported between a pair of bearing members 109 on a cross member 110 connected between the two lower longitudinal members 92 of the inner reach section 90. At the end of the shaft 108 is fixed a lever arm 111 which extends parallel to and in the same direction as the dog 106 and which has, at its end, a downwardly extending projection 112 with a curved lower edge 113 that acts as a cam follower to control the locking dog member 106. The lever arm 111 is positioned on the shaft 108 in such a manner that the curved lower edge 113 extends well below the horizontal level of the dog 106 and is aligned with a horizontal flange 114 of a lower longitudinal member 101 of the outer reach section 91 (FIG. 8). A link 117 is pivotally connected at one of its ends near the midpoint 118 of the lever arm 111 and is pivotally connected at its other end by a pin 119 to an L-shaped link 120. The link 120 has a handle portion 121 and is connected at its upper end to an upper longitudinal member 92 of the inner reach section 90. A spring member 122 is connected to the L-shaped link 120 near its pin connection 119 and also to the upper longitudinal member 92. Thus, movement of the handle 121 up and down moves the dog 106 upward or downward, but the spring 122 constantly urges both the dog 106 and the lever arm 111 downward in the locked position.

At the end of the dog 106 is a retaining projection 123 and pivotally mounted on a bracket 124 on the end of the inner reach section 90 (FIG. 8) is a retaining post 125 having an integral handle 126 which, by virtue of its weight, normally tends to rotate the post 125 in the counter-clockwise direction. The post 125 is adapted to fit under the projection 123 to retain the dog 106 in its upward intermediate retracted position when the reach 26 is to be extended.

As seen by reference to FIG. 10, the inner and outer reach sections 90 and 91 are connected in their retracted positions by means of the dog 106 which in its locking position fits within a rectangular hole 127 in a cross member 128 connected between the lower longitudinal members 101 of the outer reach section 91. In the horizontal flange 114 of the lower longitudinal member 101 of the outer reach section 91 is the rectangular slot 129 adapted to receive the downwardly extending projection 112 on the lever arm 111 of the dog control linkage 105. The lower longitudinal member 92 of the inner reach section 90 that lies directly above the longitudinal member 101 having the slot 129 is provided with a cutout portion 130 so that the downward extending projection 112 of the sensing lever 111 will extend through the cutout portion 130 and its curved lower edge 113 will ride along the along the horizontal flange 114 of the longitudinal member 101 below. Thus, since the projection 112 is free to engage the horizontal flange 114 of the longitudinal member 101, it will either drop into the slot 129 or be cammed upward when it engages the end 131 of the slot 129.

Near the outer end 133 of the outer reach section 91 and connected between the lower longitudinal members 101 is a cross bar 134 having an adjacent opening 135 for retaining the locking dog 106 when the reach sections 90 and 91 are in the extended position. A slot 136 similar to but longer than the slot 129 is also provided in the flange 114 of the lower longitudinal member 101, the slot 136 extending forward of the cross bar 134.

A bracket 137 attached to a vertical cross member 138 and connected between an upper and lower longitudinal reach member 92 serves to retain the handle 121 so that dog member 106 is properly located within the opening 127 or adjacent the cross bar 134 when in the down position. The tension of the spring 122 retains the handle 121 against the bracket 137, and also holds the linkage 105 past its center position so that it will resist any tendency for the dog member 106 to be lifted inadvertently when in the down position as shown in FIG. 8. That is, in the arrangement shown with the link 117 and the arm 120 not in alignment, any upward force on the dog member 106 would cause a clockwise rotation of the link 117 around the pin 119 and this would be resisted by the handle 121 bearing against the bracket 137.

Thus, with the reach 26 in the retracted position, when it is necessary to extend its length, the dog member 106 is raised manually by means of the lifting linkage 105, operated by the handle 121. When the handle 121 is pulled up, the dog 106 is raised out of the opening 127 and the downward extending projection 112 on the sensing lever arm 111 is simultaneously raised upward until only its curved lower edge 113 is left extending downward into the slot 129. The dog 106 and the projection 112 are held in this position by the retaining post 125 which is manually moved up under the projection 123 (see FIG. 8). With the trailer brakes on, the tractor 20 is then moved forward and the inner reach 90 slides outwardly relative to the outer reach 91. The curved lower edge 113 of the downwardly extending projection 112 engages the end 131 of the slot 129 and cams the lever arm 111 upward, pushing the dog 106 upward and causing the retaining post 125 to be released and to fall away. Thus, as the inner reach section 90 moves out of the outer reach section 91 the projection 112 on the lever arm 111 slides along the horizontal flange 114 until it reaches the outer slot 136 near the end 133 of the outer reach section 91. At this point the sensing projection 112 drops into the slot 136 allowing the end portion 107 of the dog 106 to drop downward in the opening 135 adjacent to the cross member 134, thus connecting the two reach sections 90 and 91 at their outer ends as shown in FIG. 1.

Without the aforementioned latching mechanism 105 or its equivalent, the insertion and retraction of the locking dog 106 would have to be done manually as the reach sections 90 and 91 reached the proper relative position. This would require additional time and manpower and would entail the risk of mishap during the reach extending procedure.

Since the cables 27 connecting the tractor vehicle 20 and the logging dolly vehicle 21 are long, they have a considerable weight and tend to sag. This adversely affects the steering response of the trailer 21 during turning, and it thus becomes necessary to remove this sag by adjusting the relative longitudinal positions of the two slidable reach sections 90 and 91.

Therefore, another feature of my invention is an adjustable reach extension mechanism 140 which acts to extend the reach sections 90 and 91 by forcing them slightly farther apart after the dog 106 has dropped into the opening 135. During the reach extension procedure, as described above, with the brakes of the trailer vehicle 21 set, the reach sections 90 and 91 are pulled apart until the locking dog 106 drops into the opening 135. At this point the cable tension pulls the dog member 107 back tightly against the cross bar 134. This not only allows the cables 27 to sag slightly, but it also makes it difficult to remove the dog member 107 when the reach sections 90 and 91 are to be retracted. The reach extension mechanism 140 operates to overcome both of these problems by providing an adjustable force which bears on the dog member 107 to force the reach members 90 and 91 into the desired position relative to each other with the cables 27 at the proper tension.

As shown in FIGS. 8 and 9, the reach extension mechanism 140 comprises a first bracket 141 mounted on a plate 142 fixed across the lower longitudinal members 101 on the lower side of the outer reach section 91. A second bracket 143 is aligned with said fixed bracket 141 and mounted on a pressure plate 144 which is slidably mounted in two guides 145 attached to the cross bar 134 fixed to the bottom of the outer reach section 91. The brackets 141 and 143 are shaped to form end members 147 and 148 which oppose each other and which are adapted to retain the ends of a pair of threaded rods 151. The rods 151 are threaded to a pair of nuts 149 fixed to opposite ends of a central turnbuckle member 150. Movement of the central turnbuckle member 150 causes the bracket 143 to move relative to the bracket 141 which forces the pressure plate 144 against the locking dog 106 thus pulling the reach sections 90 and 91 slightly apart while pushing the dog 106 away from its position against the cross bar 134 and into the opening 135 (see FIG. 9). This movement of the reach extension mechanism 140 increases the tension of the cables 27, thus removing the sag in them and making them more responsive to turning control movements. When the trailer sections 90 and 91 are to be retracted, the turnbuckle 150 is turned back, releasing the cable tension so that the locking dog 106 can be easily lifted upward to the intermediate position by the handle 121 where it can then be automatically cammed upward, as described previously, as the reach sections 90, 91 are moved together when the dolly brakes are on.

Another important feature of my invention, as shown in FIGS. 11 and 12 is a system for controlling the disposition of flexible hoses, cables or wires which must extend from the tractor vehicle to the dolly in most conventional tractor-trailer hook-ups to control the brakes, lights, or other equipment. For example, trailer brakes are generally supplied by a compressed air source on the tractor, and thus long hoses must be provided from the tractor for this purpose. When the reach is extended or retracted the hoses must, of course, be paid out or doubled up and yet this must be done without causing any sharp twists, turns, or kinking of the hoses.

In FIGS. 11 and 12 I have shown means for handling the flexible conduits from the tractor to the dolly such as the compressed air and the lighting wires. The drawings are schematic and show the conduits represented by a double line 155 extending from a fixed connection 156 located within the inner reach 90 where it is connected to the tractor vehicle 20 near the attaching frame 97. The conduit 155 extends down the length of the inner section 90 and around one sheave 157 of a double sheave pulley 158, and from this point the conduit 155 extends back up the inner reach section 91 around a first fixed pulley 159, then back and around a second fixed pulley 160 mounted at the unattached end of the inner reach section 90. On the outer reach section 91 a cable support 161 for the flexible conduit 155 is fixed at one end 162 to the outer reach section 91 near its attachment to the frame 59 mounted dolly load bed 25. From the fixed point 162 on the outer reach section 91 the support cable 161 extends around the second sheave 163 on the double sheave pulley 158 and thence to a fixed point 164 near the end of the inner reach section 90. From the drawings it is apparent the flexible conduit is thus supported at all times during the extension and retraction of the reach sections 90 and 91. This is a vital function since it assures smooth operation and easy hook-up of the body brakes and lights when the dolly 21 is being connected in either the shortened or extended positions.

In summarizing the operation of my steering system it is apparent from the above description that all of the major components can readily be pre-assembled in kit form and then easily attached to any standard tractor and logging dolly type of trailer with fixed axles. Thus, the support frame 60 on which is mounted the steering bar 22 may be bolted or welded to the tractor frame 63, and similarly, the steering bar assembly 23 can be attached to the logging dolly frame 29. The cables 27 are attached to the steering bars 22 and 23 in the crossing arrangement with the reach sections 90, 91 in the retracted position. The reach can then be extended and the cables tightened in the manner described above, preferably before the load is attached.

As the tractor 20 commences a turn as shown in FIG. 2, the steering bar assembly 22 fixed thereto also turns. The cable 27 on the outside of the turn extending rearward from the steering bar 22 is caused to rotate the steering bar 23 and hence the entire dolly 21 in the opposite direction relative to the reach 26 or the load bed 25. The amount of turning of the dolly 21 relative to the amount of turning of the tractor 20 is adjusted to a predetermined amount by the location of the cable attachments on the steering bars 22 and 23, and this amount is just enough to cause the dolly 21 to track along a predetermined desired path behind the tractor 20 during all turns. During all turning maneuvers the load beds 24 and 25 are kept in a fixed relationship by the reach 26 and they are moved easily relative to the steering bar assemblies 22 and 23 due to their friction reducing cup and saucer bearing construction.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In combination with a tractor vehicle having a frame and a trailer vehicle having a frame and fixed axles attached thereto, an automatic steering device for causing said trailer to turn an amount proportional to an amount of turning of said tractor vehicle in order for said trailer to track directly behind said tractor during turns, said steering device comprising: a first steering bar rigidly fixed to said tractor frame; a second steering bar rigidly fixed to said trailer frame; a first load bed rotatably mounted on said first steering bar; a second load bed rotatably mounted on said second steering bar; an extendable reach comprising inner and outer slidable reach sections, said reach sections being rigidly connected to said first and second load beds respectively; locking means for connecting said reach sections together at the retracted position, crossed cable means attached at predetermined spaced apart locations on said first and second steering bars, each said cable means being attached at one end to said steering bar on one side of said tractor and to said trailer steering bar on the opposite side; and means for moving and maintaining said reach sections at a fixed extended position relative to each other in order to obtain adequate cable tension between said tractor and said trailer vehicles and for releasing said locking means for movement into the position for full automatic release when said reaches are to be retracted, said latter means comprising a bar slidably attached to one said reach section, movable to a fixed position relative thereto and adapted to bear at one end against said reach locking means when said reach sections are partially extended, and means for moving said bar to force said reach sections apart to the fully extended position against the tension in said cables.

2. In combination with a tractor vehicle having a frame and a trailer vehicle having a frame and fixed axles attached thereto, an automatic steering device for causing said trailer to turn an amount proportional to an amount of turning of said tractor vehicle in order for said trailer to track directly behind said tractor during turns, said steering device comprising: a first steering bar rigidly fixed to said tractor frame; a first load bed rotatably mounted on said first steering bar; a second steering bar fixed to the frame of said trailer; a second load bed rotatably mounted on said second steering bar; a reach rigidly connected to said first and second load beds; crossed cable means attached at predetermined spaced apart locations on said first and second steering bars, each said cable means being attached at one end to said steering bar on one side of said tractor and to said trailer steering bar on the opposite side; adjustable means for controlling the tension in said cables and for thereby maintaining precision in the turning response of said trailer to movements by said tractor; and means on said steering bars for attaching said cables at different locations thereon to thereby change the steering ratio between said trailer and said tractor vehicles so that said trailer can be made to follow behind said tractor vehicle along any predetermined path.

3. In combination with a tractor vehicle having a frame and a trailer vehicle having a frame and fixed axles attached thereto, an automatic steering device for causing said trailer to turn an amount proportional to an amount of turning of said tractor vehicle in order for said trailer to track directly behind said tractor during turns, said steering device comprising: a telescoping reach pivotally attached at its ends to and interconnecting said tractor and trailer vehicles; crossed steering cable means attached at predetermined spaced apart locations to said tractor and said trailer vehicles, each said cable means being attached at one end to one side of said tractor and to said trailer on the opposite side; means on said reach for maintaining tension in said cables when said reach extended and thereby maintaining precision in the turning response of said trailer to movements by said tractor; and means on said tractor and trailer vehicles for attaching said cables at different locations from their longitudinal central axis to change the steering ratio between said trailer and said tractor vehicles so that said trailer can be made to follow behind said tractor vehicle along any predetermined path.

4. In combination with a tractor vehicle having a frame and a trailer vehicle having a frame and fixed axles attached thereto, an automatic steering device for causing said trailer to turn an amount proportional to an amount of turning of said tractor vehicle in order for said trailer to track along a predetermined path behind said tractor during turns, said steering device comprising: a first steering bar rigidly fixed to said tractor frame; a second steering bar rigidly fixed to said trailer frame; a first load bed rotatably mounted on said first steering bar; a second load bed rotatably mounted on said second steering bar; crossed cable means connected at predetermined spaced apart locations on said first and second steering bars, each said cable means being removably attached at one end to said steering bar on one side of said tractor and to said trailer steering bar on the opposite side; an extendable telescoping reach comprising inner and outer slidable reach sections rigidly connected at one end to said first and second load beds respectively; and means on one of said reach sections for engaging and exerting a force on the other said reach section tending to extend said reach sections, thereby increasing and maintaining tension in said cables when said reach is in the extended position.

5. In combination with a tractor vehicle having a frame and a trailer vehicle having a frame and fixed axles attached thereto, an automatic steering device for causing said trailer to turn an amount proportional to an amount of turning of said tractor vehicle in order for said trailer to track along a predetermined path behind said tractor during turns, said steering device comprising: a first steering bar rigidly fixed to said tractor frame; a second steering bar rigidly fixed to said trailer frame; a first load bed rotatably mounted on said first steering bar; a second load bed rotatably mounted on said second steering bar; a pair of crossed steering cables connected at predetermined spaced apart locations on said first and second steering bars, each said cable being removably attached at one end to said steering bar on one side of said tractor and to said trailer steering bar on the opposite side; an extendable reach comprising inner and outer telescoping reach sections each rigidly connected at one end to said first and second load beds respectively; locking means for connecting said inner and outer reach sections together at both the extended and retracted positions; means for automatically actuating said locking means when said slidable reach sections are moved to their fully extended or retracted positions; and means on one of said reach sections and associated with said locking means for engaging and exerting a force on the other said reach section tending to push said reach sections apart, thereby increasing and maintaining tension in said cables when said reach is in the fully extended position.

6. In combination with a tractor vehicle having a frame and a trailer vehicle having a frame and fixed axles attached thereto, an automatic steering device for causing said trailer to turn an amount proportional to an amount of turning of said tractor vehicle in order for said trailer to track along a predetermined path behind said tractor during turns, said steering device comprising: a first steering bar rigidly fixed to said tractor frame; a second steering bar rigidly fixed to said trailer frame; a first load bed rotatably mounted on said first steering bar; a second load bed rotatably mounted on said second steering bar; a pair of crossed steering cables connected at predetermined spaced apart locations on said first and second steering bars, each said cable being removably attached at one end to said steering bar on one side of said tractor and to said trailer steering bar on the opposite side; an extendable reach comprising inner and outer telescoping reach sections rigidly connected at one end to said first and second load beds respectively; locking means for connecting said inner and outer reach sections together including a locking dog member pivotally mounted on one of said reach sections adapted to fit within openings located near the opposite ends of the other said reach section; control means for automatically actuating said locking dog to cause it to enter a said opening when said slidable reach sections have been moved to their fully extended or retracted positions; and means on the other of said reach sections for engaging and exerting a force on said one reach section tending to extend said reach sections, thereby increasing and maintaining tension in said cables when said reach is in the fully extended position.

7. The device as described in claim 6 wherein said control means comprises a cam follower arm rigidly connected to said locking dog and adapted to keep said dog disengaged during relative motion of said reach sections and to release said dog for insertion in said opening when said reach sections arrive at either the fully retracted or extended positions.

8. The device as described in claim 7 wherein the means on the other of said reach sections comprises an axially adjustable member retained by said other reach section and adapted to bear against said locking dog on said one reach section thereby tending to push said reach sections apart.

9. In combination with a tractor vehicle having a frame and a trailer vehicle having a frame and fixed axles attached thereto, an automatic steering device for causing said trailer to turn an amount proportional to an amount of turning of said tractor vehicle in order for said trailer to track along a predetermined path behind said tractor during turns, said steering device comprising: a first steering bar rigidly fixed to said tractor frame; a second steering bar rigidly fixed to said trailer frame; a first load bed rotatably mounted on said first steering bar; a second load bed rotatably mounted on said second steering bar; a pair of steering cables attached at predetermined spaced apart locations on said first and second steering bars, each said cable being attached at one end to said steering bar on one side of said tractor and to said trailer steering bar on the opposite side; an extendable reach comprising inner and outer telescoping reach sections rigidly connected to said first and second load bed; L-shaped locking means pivotally mounted on one said reach section; means on said other reach section forming an opening to receive said locking means to connect said reach sections together in the extended position; and means attached to said reach sections tending to push against said locking means and to push said reach sections apart thereby maintaining tension in said cables and enabling them to maintain precision in the turning response of said trailer to movements by said tractor.

10. In combination with a tractor vehicle having frame and a trailer vehicle having a frame and fixed axles attached thereto, an automatic steering device for causing said trailer to turn an amount proportional to an amount of turning of said tractor vehicle in order for said trailer to track along a predetermined path behind said tractor during turns, said steering device comprising: a first steering bar rigidly fixed to said tractor frame; a second steering bar rigidly fixed to said trailer frame; a first load bed rotatably mounted on said first steering bar; a second load bed rotatably mounted on said second steering bar; a pair of cable means attached at predetermined spaced apart locations on said first and second steering bars, each said cable means being attached at one end to said steering bar on one side of said tractor and to said trailer steering bar on the opposite side; an extendable reach comprising inner and outer telescoping reach sections rigidly connected to said first and second load bed; a reach connecting means on one of said reach sections; means on said other reach section forming an opening for receiving said connecting means; means for causing said connecting means automatically to enter said opening when aligned therewith during extension of said reach; means associated with said latching means and attached to said reach sections tending to push them apart thereby maintaining tension in said cable means and enabling them to maintain precision in the turning response of said trailer to movements by said tractor.

11. In combination with a tractor vehicle having a frame and a trailer vehicle having a frame and fixed axles attached thereto, an automatic steering device for causing said trailer to turn an amount proportional to an amount of turning of said tractor vehicle to cause said trailer to track along a predetermined path behind said tractor during turns, said steering device comprising: a first steering bar rigidly fixed to said tractor frame; a second steering bar rigidly fixed to said trailer frame; a first load bed rotatably mounted on said first steering bar; a second load bed rotatably mounted on said second steering bar; an extendable reach rigidly connected to said first and second load beds; a pair of cables attached at predetermined spaced apart locations on said first and second steering bars, each said cable means being attached at one end to said steering bar on one side of said tractor and to said trailer steering bar on the opposite side; and means on one of said reach sections for engaging and exerting a force on the other said reach section tending to extend said reach sections, thereby increasing the tension of said cables when said reach is extended to maintain precision in the turning response of said trailer to movements by said tractor.

12. The device as described in claim 11 including means on said steering bars for attaching said cables at different locations thereon to thereby change the steering ratio between said trailer and said tractor vehicles so that said trailer can be made to follow behind said tractor vehicle along any predetermined path.

References Cited in the file of this patent

UNITED STATES PATENTS

| | | |
|---|---|---|
| 1,208,657 | Rider | Dec. 12, 1916 |
| 2,197,401 | Weber | Apr. 16, 1940 |
| 2,285,784 | Scott | June 9, 1942 |
| 2,481,695 | Scott | Sept. 13, 1949 |
| 2,605,113 | Gilmore | July 29, 1952 |
| 2,764,424 | Standing | Sept. 25, 1956 |
| 2,818,272 | De Lay | Dec. 31, 1957 |

FOREIGN PATENTS

| | | |
|---|---|---|
| 101,915 | Switzerland | Oct. 16, 1923 |
| 543,362 | France | June 1, 1922 |